Patented Sept. 3, 1929.

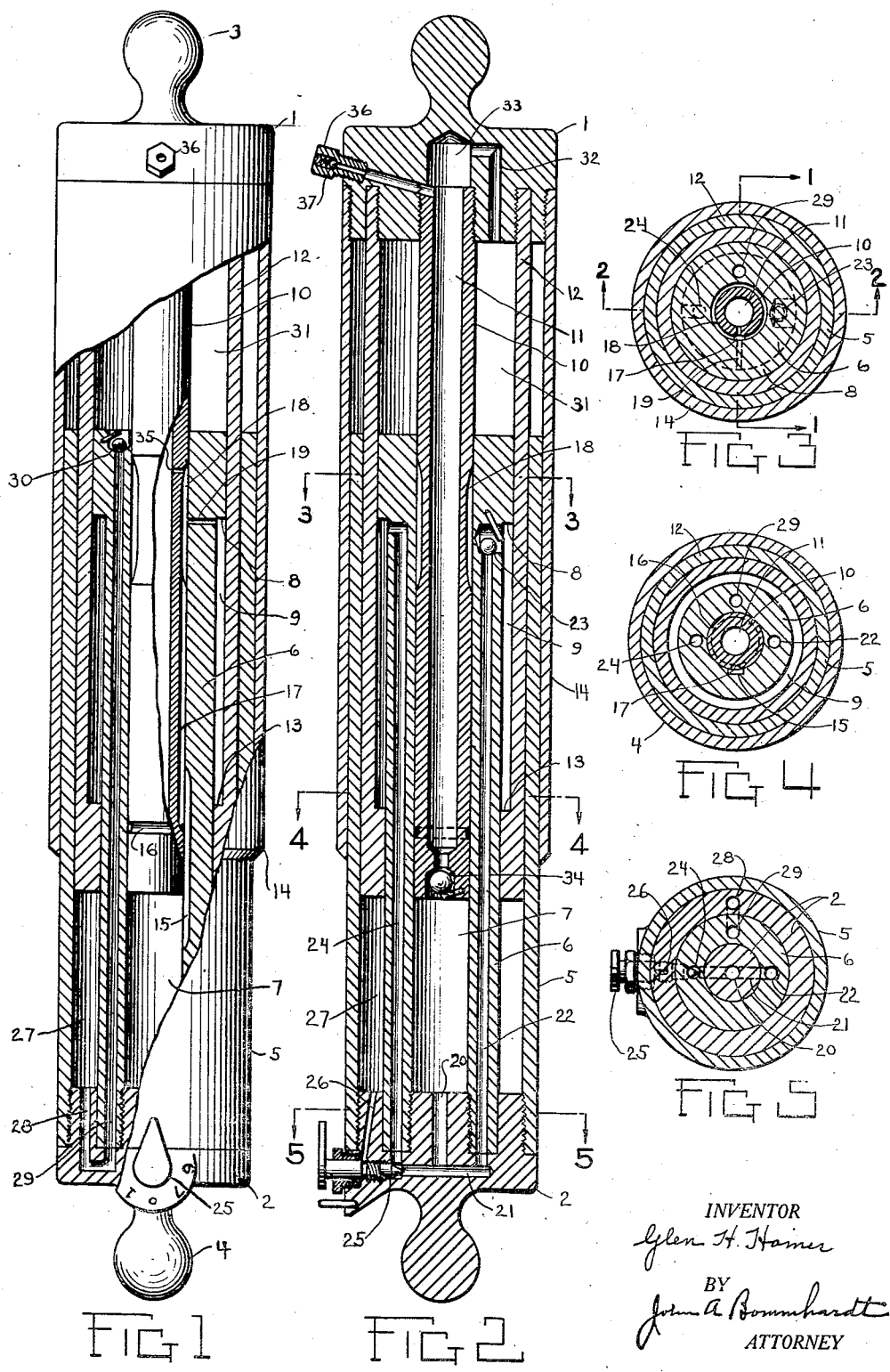

1,727,121

UNITED STATES PATENT OFFICE.

GLEN H. HAINES, OF CUYAHOGA FALLS, OHIO.

SHOCK ABSORBER.

Application filed February 23, 1928. Serial No. 256,327.

The subject of this invention is a simplified hydraulic shock absorber for vehicles and other uses providing a replenishing chamber and two compression chambers. The compression chambers while of different diameters have the same capacity for the same length. Some of the advantages are that there are no gaskets, packing or stuffing boxes for the pistons neither are there shafts, gears, connecting links, toggles, springs, bearings or journals. Furthermore the one moving part has a reciprocating motion and is not subject to wear due to one-sided pressure.

In the drawings, Fig. 1 is a front view, showing parts in section; Fig. 2 is a transverse vertical section; Figs. 3, 4, and 5 are horizontal sections on lines 3—3, 4—4 and 5—5 respectively of Fig. 2.

The head piece 1 and tail piece 2 are shown conveniently equipped with spherical projections 3 and 4 adapted to engage in sockets attached to suitable parts of the automobile or other device upon which the shock absorber is used.

Said tail piece has attached thereto an outer sleeve 5 and an inner sleeve or cylinder 6. Said inner sleeve 6 forms the low pressure chamber 7 and a flange or head 8 on the upper portion of said inner sleeve 6 forms the piston of the high pressure chamber 9.

The head piece 1 has attached thereto the plunger 10 for the low pressure chamber 7 and a cavity within said plunger 10 provides a replenishing chamber 11. Said head piece 1 also has attached thereto an intermediate sleeve or cylinder 12 which together with the flange or head 13 within the lower edge thereof forms the walls and end of the before mentioned high pressure chamber 9. An outer dust excluding sleeve 14 may conveniently be attached to said head piece 1.

In an automobile it is desirable during minor fluctuations of the springs that the shock absorber be inoperative, therefore the wall of the low pressure chamber 7 has a channel 15 scored in it at a predetermined location providing a path for the liquid in the low pressure chamber 7 to flow back and forth to the high pressure chamber 9 through said channel 15, an annular groove 16 in the plunger 10 communicating with a longitudinal groove 17 in said plunger 10 and thence through a broad groove 18 in said plunger 10 through a port 19 into the high pressure chamber 9.

When the plunger 10 travels below the end of before mentioned channel 15 the liquid must pass through ports 20 and 21 in the tail piece and through a port or passage 22 in the inner sleeve 6 and through a check valve 23 into high pressure chamber 9 thereby providing a low pressure shock absorbing effect as is required upon compression of the springs of an automobile.

On the rebound or opposite stroke the before mentioned check valve 23 closes but there is another port 24 also communicating from the port 21 in the tail piece 2 to the high pressure chamber 9, controlled however by an adjustable needle valve 25 whereby the speed of the stroke or rebound may be controlled or delayed.

Seepage past the threads of the needle valve 25, instead of escaping to the outside, passes through relief port 26 into sump chamber 27 as does also any seepage between the lower end of the intermediate sleeve 12 and the inner sleeve 6. Each time a down stroke occurs the sump chamber 27 is emptied through vent ports 28 and 29 past a check valve 30 to an upper receiving chamber 31 and thence through a return port 32 into an air chamber 33 and down into the replenishing chamber 11.

Upon any deficiency arising in the low pressure chamber 7 the supply valve 34 in the bottom of the replenishing chamber 11 will open and supply the needed amount of liquid.

A small air vent 35 is provided at the top of the pressure system to remove any entrained air.

A filler plug 36 is provided for introducing glycerine or other suitable liquid. Said filler plug may conveniently be equipped with an air vent 37. It will be noted that the return port 32 opens into the air chamber 33 above the level of the filler plug 36 thus avoiding the danger of over filling the device.

It will be seen that the construction of this device adapts it to universal application in that there is no difference between right hand and left hand outfits.

I claim:

1. A shock absorber comprising telescopic sleeves the inner ends of which form pistons, a plunger working in the inner sleeve, the pistons working in the spaces between the plunger and sleeves respectively and forming a high pressure chamber between the pistons, the inner sleeve and plunger forming a low pressure chamber, the inner sleeve having a port therein provided with a check valve opening from the low pressure chamber to the high pressure chamber and another restricted return port permitting reverse flow from the high pressure to the low pressure chamber.

2. A shock absorber as in claim 1, the plunger having a replenishing chamber therein with a check valve opening into the low pressure chamber.

3. A shock absorber comprising opposite heads, inner and outer sleeves attached to one head, a central plunger and intermediate sleeve attached to the other head and telescoping with said inner and outer sleeves, the inner and intermediate sleeves having enlarged pistons forming a high pressure chamber therebetween, the plunger and inner sleeve defining a low pressure chamber in said sleeve, the latter having separate ports in the wall thereof connecting the high and low pressure chambers, one of said ports having a check valve opening into the high pressure chamber and the other port having means to adjustably restrict the same.

4. A shock absorber as in claim 3, the plunger and inner sleeve having a by-pass connecting said chambers and operative during only an initial part of the compression stroke of the plunger.

5. A shock absorber as in claim 3, the plunger having a replenishing chamber therein with a check valve opening into the low pressure chamber, said replenishing chamber also communicating with a receiving space between the plunger and the intermediate sleeve.

6. A shock absorber comprising opposite heads, inner and outer sleeves attached to one head, a central plunger and intermediate sleeve attached to the other head and telescoping with said sleeves and forming a receiving chamber adjacent one head and low pressure and sump chambers adjacent the other head, the inner and intermediate sleeves having pistons at their inner ends forming a high pressure chamber therebetween, the inner sleeve having direct and return flow passages therein connecting the low and high pressure chambers, and also having a passage connecting the receiving and sump chambers.

7. A shock absorber as in claim 6, the plunger having a replenishing chamber therein communicating with the low pressure chamber and also with the receiving chamber, and a check valve between the replenishing chamber and the low pressure chamber.

In testimony whereof, I do affix my signature.

GLEN H. HAINES.